United States Patent [19]

French

[11] Patent Number: 5,095,412

[45] Date of Patent: Mar. 10, 1992

[54] ILLUMINATED FLOOR PANEL

[75] Inventor: Stephen French, Tayside, Scotland

[73] Assignee: William Leith, United Kingdom

[21] Appl. No.: 675,077

[22] Filed: Mar. 25, 1991

[30] Foreign Application Priority Data

Mar. 27, 1990 [GB] United Kingdom ............... 9006767

[51] Int. Cl.⁵ .................................................. F21S 1/02
[52] U.S. Cl. ....................................... 362/153; 362/364; 362/800
[58] Field of Search .................. 362/153, 153.1, 234, 362/252, 364, 800, 240

[56] References Cited

U.S. PATENT DOCUMENTS 4,303,969 12/1981 Hamilton et al. ................. 362/153
4,340,929 7/1982 Konikoff et al. ................... 362/153
4,737,764 4/1988 Harrison ............................ 362/153

Primary Examiner—Stephen F. Husar
Attorney, Agent, or Firm—Rodman & Rodman

[57] ABSTRACT

A floor panel, suitable for assembly with similar panels into an illuminated portable floor, takes the form of a rectangular wooden panel having a number of first apertures in its lower face and a number of second apertures in its upper face, each second aperture intersecting one of the first apertures, a number of illumination devices such as light-emitting diodes or incandescent lamps located in the first apertures, one or more transparent or translucent covers over the second apertures, and electrical connectors such as electric wires to convey power to the illumination devices from the underside of the panel.

14 Claims, 1 Drawing Sheet

ILLUMINATED FLOOR PANEL

The present invention relates to floors which may be assembled from floor panels and subsequently dismantled, for reassembly on a subsequent occasion at the same or another location.

Floors of the foregoing type may be used to provide a desired surface on a casual basis on top of a surface which is less suitable to the desired purpose. For example, by means of portable panels, a dance floor may be installed temporarily on top of a normal indoor floor, such as in a hotel, or a firm and stable floor may be laid over grass, such as out-of-doors or in a marquee.

When a fixed existing floor is used for dancing in particular, it may be desired to instal some form of floor-based illumination. This may fairly readily be achieved by setting light-emitting diodes (LED's) into the floor itself or installing small incandescent lamps in sockets cut in the floor, the wires to convey electrical power to the LED's or lamps also being set in the floor surface. The installed illumination may then be protected by means of overlying layer or sheet of a strong transparent material. However it is much more difficult to envisage a practical method of providing in-build illumination in a portable floor formed from panels. It would appear that no such illuminated floor panel for portable floors is available or otherwise hitherto known.

It is therefore an object of the present invention to provide an illuminated floor panel suitable for the construction of portable floors.

The panel according to the present invention comprises a generally rectangular wooden panel having a plurality of first apertures extending into the panel from a first face of said panel and a plurality of second apertures extending into the panel from a second face of said panel opposed to said first face, said second apertures being located to each intersect a corresponding first aperture, a plurality of illumination devices each located in one of said first apertures so as to be visible through the corresponding second aperture, at least one transparent or translucent cover covering the second apertures on the second face of the panel, and electrical connection means to convey electrical power to the illumination devices from the direction of the first face of the panel.

A dance floor or other portable floor may readily be assembled from a number of the floor panels according to the invention and, when electrical power is supplied to the illumination devices from the direction of the first face of the panels, which forms the underside of the portable floor, an illuminated display is provided in the floor (formed by the visible second surface of the panels) by the illumination devices. These devices may be maintained in a lit condition or may, either individually in a predetermined sequence or collectively, be switched on and off in succession.

The panel is generally rectangular and is wooden and may for example be formed from planed timber or as an assembled laminate. The side edges of the panel may advantageously be trimmed with metal, for example with extruded aluminium strip, to reinforce and protect those edges and/or to assist their interconnection to form an assembled floor. Various methods of connecting together known panels to form a portable floor are known and such prior methods may be adopted with the panel according to the present invention.

In general, the first apertures extending from the rearward first face of the panel are preferably circular in cross-section and are preferably of such dimensions that the illumination devices are each a close fit within an aperture. The second apertures may also be circular in cross-section or may be square, triangular, rectangular or any other desired shape. The respective first and second apertures may be aligned in pairs on a common axis in each case. Thus, for example, each first aperture may be circular and coaxially aligned with a circular second aperture. When the apertures of both sets are circular and aligned in this way, they may be formed by a single drilling operation from one face of the panel.

Preferably the cross-sectional area of each second aperture is greater than that of the corresponding first aperture; for example, when all the apertures are circular, the second apertures may each be of grater diameter than that of the corresponding first aperture.

The illumination devices are each located in one of the first apertures. They may be of various types. For example they may be light-emitting diodes (LED's) or small incandescent lamps. They may be individually coloured in any of a range of colours or may be all of the same colour, differences in colour in the display being achieved by covering them with differently-coloured covers if desired.

The illumination devices may be covered by a single transparent or translucent cover extending across the whole, or a major part, of the area of the second face of the panel. Alternatively and preferably, each illumination device may be covered by a separate transparent or translucent cover. In this latter case, each cover may be located in one of said second apertures.

The material of each cover may itself be translucent or transparent. As an alternative, a cover formed of a transparent material may be rendered merely translucent by texturing of one or both surfaces of the cover. The material may be glass or more preferably is a synthetic plastics material, especially an acrylic plastics material. Suitable such acrylic materials include those sold under the respective trade names of PERSPEX and LEXAN. Thus in a particularly preferred form, each cover is a disc of PERSPEX acrylic plastic.

The illumination devices are supplied with electrical power from the direction of the first face of the panel, which as indicated above is intended to form the rear or underside of the assembled floor in use. The electrical connection means are therefore located on or within that first face of the panel. These connection means may conveniently comprise electric wires extending from each illumination device to a suitable power source, for example a mains socket or electrical generator. In a particularly preferred form of the invention, at least some of the first apertures are disposed along at lease one rectilinear path over the first face of the panel and extend into the thickness of the panel from a channel cut in that first face, thereby enabling the electric wires or other connection means to be located within the channel. The channel may then advantageously be filled with a suitable encapsulation material, for example a cured resin, to retain the connection means in place within the channel and also protect these means and the illumination means from damage.

Electrical interconnection between adjacent panels may be provided if desired by means of suitable contacts, especially sprung contacts, located in the side edges of the panels.

The invention will now be further described and illustrated, by way of example only, with reference to the accompanying drawings, wherein.

Figure 1:
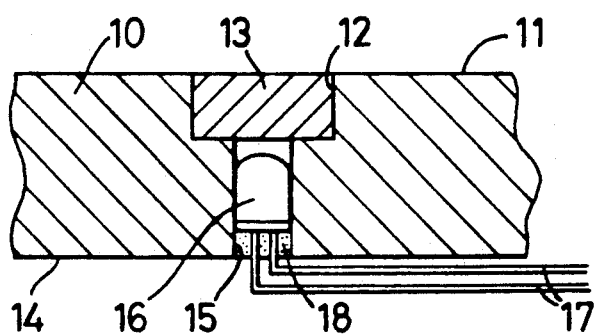
FIG. 1 is a vertical sectional view of a first embodiment of the floor panel according to the invention.

The floor panel illustrated in FIG. 1 comprises a rectangular wooden panel 10 of laminated board, approximately 75 cm square and approximately 2.5 cm in thickness. The edges of the board are protected by lengths of extruded aluminium strip (not shown in FIG. 1) and a number of such panels are intended to be connected together, edge to edge, to form a portable dance floor. At numerous locations over the upper surface 11 of the panel, shallow apertures 12 extend part of the way into the panel thickness. A squat disc 13 of "Perspex" acrylic resin is located in each aperture 12.

In the underside or lower surface 14 of the panel 10, a number of apertures 15 have been bored, each aperture 15 being coaxially aligned with an aperture 12 and being of smaller diameter than it. Within each aperture 15 is located an LED 16, supplied with electrical power by wires 17, which are led across the surface 14. The LED 16 is a close fit within the aperture 15 and is retained in place by means of encapsulating resin 18. When the power supply to the LED is switched on, the light from the LED is seen in the upper surface 11 of the panel, that is in the surface of the dance floor, via the disc 13.

Figure 2:
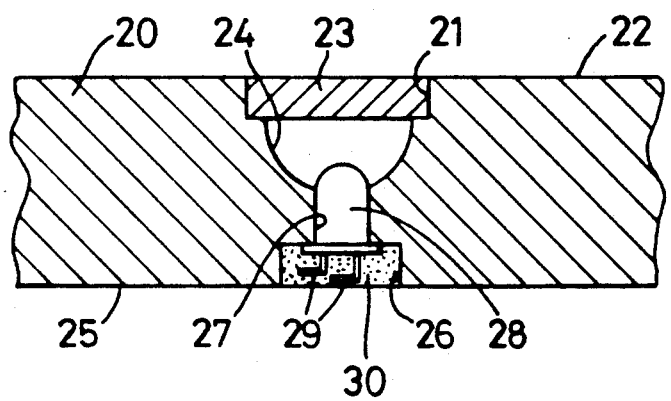
FIG. 2 is a corresponding view of a second embodiment of the floor panel.

The second form of floor panel, shown in FIG. 2, represents a preferred embodiment. As shown, the laminated wooden panel 20 has a number of shallow circular apertures 21 distributed over its upper surface 22. In each aperture 21, a "Perspex" acrylic disc 23 is located. Into the inward end of each aperture 21, a hemispherical drilling 24 has been cut, to form a reflective surface behind the disc 23.

Across the rearward face 25 of the panel 20 a number of rectilinear channels 26 are cut, each extending along a path passing through the extended axes of a number of the apertures 21. Apertures 27 are drilled from the channels 26 such that each aperture 27 is coaxially aligned with, and of smaller diameter than, an aperture 21. An LED 28 is located in each aperture 27 and projects into the drilling 24. Wires 29, extending along the channels 26, convey an electrical supply to the LED's 28. The channels 26 are filled with an encapsulating resin 30 to protect the LED's and the wires.

Figure 3:
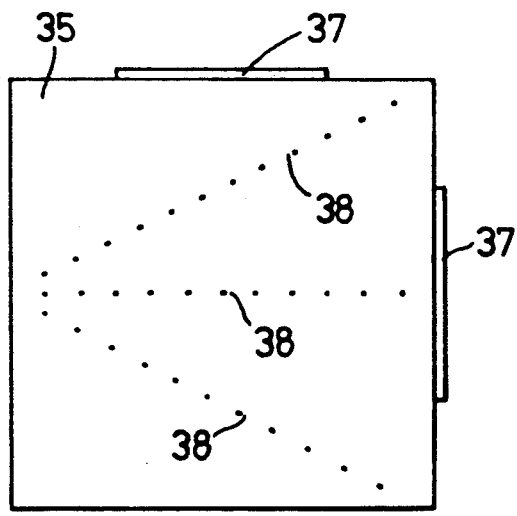
FIGS. 3 and 4 are simplified plan views of alternative floor panels according to the invention.
Figure 4:
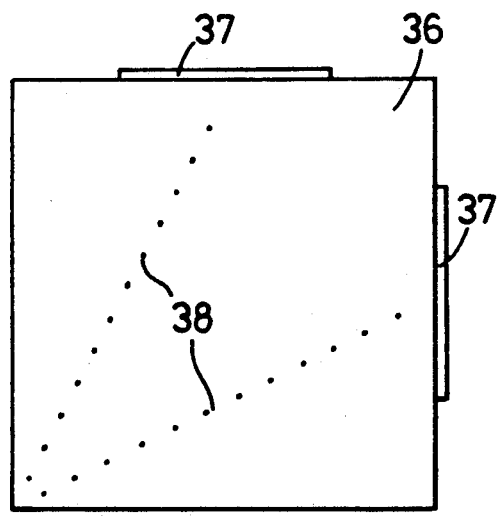

Referring now to FIGS. 3 and 4, the illustrated panels, 35 and 36 respectively, each have connectors 37 projecting from two of their four sides to enable the panels to be joined to further panels to form a portable floor. The rows of dots 38 represent discs 13 or 23, through each of which an LED 16 or 28 is visible in use. Because the discs are grouped in rectilinear rows, the electrical supply to the LED's may be set in channels 26 such as are illustrated in FIG. 2. If desired, electrical connection between adjacent panels may be provided by means of contacts (not shown) associated with the connectors 37.

The power supply to the panels according to the invention is advantageously a low-voltage DC supply. If desired, the control of the lighting sequence for each panel may be by means of a microchip, encapsulated in a rebate in the rear of the panel.

What is claimed:

1. A panel for assembly into a portable floor, comprising a generally rectangular wooden panel having a plurality of first apertures extending into the panel from a first face of said panel and a plurality of second apertures extending into the panel from a second face of said panel opposed to said first face, said second apertures being located to each intersect a corresponding first aperture, a plurality of illumination devices each located in one of said first apertures so as to be visible through the corresponding second aperture, at least one transparent or translucent cover covering the second apertures on the second face of the panel, and electrical connection means to convey electrical power to the illumination devices from the direction of the first face of the panel.

2. A floor panel according to claim 1, in the form of a wooden laminate.

3. A floor panel according to claim 1, wherein said first apertures are of generally circular cross-section.

4. A floor panel according to claim 3, wherein said illumination devices are each a close fit within a said first aperture.

5. A panel for assembly into a portable floor, which panel comprises
   (a) a generally rectangular wooden panel having a plurality of first apertures extending thereinto from a first face thereof and a plurality of second apertures extending thereinto from a second face thereof;
   (b) said second apertures being of greater cross-sectional area than said first apertures;
   (c) said first and second apertures being aligned in mutually intersecting relationship in pairs, each comprising one of said first apertures and one of said second apertures;
   (d) a plurality of illumination devices each located in one of said first apertures;
   (e) at least one transparent or translucent cover closing said second apertures; and
   (f) electrical connection means connected to said illumination devices in the region of said first face of said panel.

6. A floor panel according to claim 5, wherein said first apertures are of generally circular cross-section.

7. A floor panel according to claim 6, wherein said second apertures are of generally circular cross-section and of greater diameter than said first apertures.

8. A floor panel according to claim 7, wherein said first and second apertures in said pairs are coaxially aligned.

9. A floor panel according to claim 5, wherein said illumination devices are light-emitting diodes or incandescent lamps.

10. A floor panel according to claim 5, wherein said electrical connection means are electric wires.

11. A panel for assembly into a portable floor, which panel comprises
   (a) a generally rectangular wooden panel having first and second faces;
   (b) a plurality of first generally circular apertures in said first face;
   (c) a plurality of second generally circular apertures in said second face;
   (d) said first and second apertures being in coaxially aligned pairs;
   (e) said second apertures being of greater diameter than said first apertures;

(f) an illumination device located in each of said first apertures;

(g) a transparent or translucent cover in each of said second apertures; and (h) electric wires extending into said first apertures and electrically connected to said illumination devices.

12. A floor panel according to claim 11, wherein said covers are of glass or an acrylic plastics material.

13. A floor panel according to claim 11, having at least one rectilinear channel on said first face, from which said first apertures extend.

14. A floor panel according to claim 13, wherein said channel is filled with an encapsulating resin.

* * * * *